(12) United States Patent
Miller et al.

(10) Patent No.: US 7,311,951 B2
(45) Date of Patent: Dec. 25, 2007

(54) PHORETIC DISPLAY

(75) Inventors: Richard Jonathan Miller, Malvern (GB); Victor Chaklam Hui, Malvern (GB)

(73) Assignee: Qinetiq Limited (GB)

( * ) Notice: Subject to any disclaimer, the term of this patent is extended or adjusted under 35 U.S.C. 154(b) by 271 days.

(21) Appl. No.: 10/922,512

(22) Filed: Aug. 20, 2004

(65) Prior Publication Data
US 2005/0042392 A1 Feb. 24, 2005

(30) Foreign Application Priority Data
Aug. 22, 2003 (GB) ................. 0319739.9

(51) Int. Cl.
*C09K 19/56* (2006.01)
(52) U.S. Cl. .................. 428/1.2; 428/1.1; 349/129; 345/107
(58) Field of Classification Search ............... 428/1.2, 428/1.23; 349/129–132; 345/107
See application file for complete search history.

(56) References Cited

U.S. PATENT DOCUMENTS

| | | | | |
|---|---|---|---|---|
| 5,013,141 A * | 5/1991 | Sakata | ................ | 349/201 |
| 5,956,113 A * | 9/1999 | Crawford | ................ | 349/185 |
| 6,014,197 A * | 1/2000 | Hikmet | ................ | 349/201 |
| 6,287,649 B1 * | 9/2001 | Fukushima et al. | ........... | 428/1.2 |
| 6,713,238 B1 * | 3/2004 | Chou et al. | ................ | 430/322 |
| 6,867,837 B2 * | 3/2005 | Fijol | ................ | 349/132 |
| 6,906,779 B2 * | 6/2005 | Chan-Park et al. | ........... | 355/50 |
| 6,922,219 B2 * | 7/2005 | Jin et al. | ................ | 349/113 |
| 6,992,741 B2 * | 1/2006 | Kitson et al. | ................ | 349/128 |
| 7,145,626 B2 * | 12/2006 | Miller et al. | ................ | 349/166 |
| 2002/0196403 A1 * | 12/2002 | Kitson et al | ................ | 349/177 |

FOREIGN PATENT DOCUMENTS

| | | |
|---|---|---|
| EP | 1 139 154 | 10/2001 |
| GB | 1 139 153 A1 * | 10/2001 |

* cited by examiner

*Primary Examiner*—Rena Dye
*Assistant Examiner*—Sow-Fun Hon
(74) *Attorney, Agent, or Firm*—McDonnell Boehnen Hulbert & Berghoff LLP (57) ABSTRACT

A phoretic display having a liquid crystal suspension medium and a relief structure alignment layer comprising a relief structure surface incorporating a plurality of indentations. The relief structure alignment layer is adapted to generate a preferred alignment of the liquid crystal suspension medium within the display by creating defects within the alignment of the liquid crystal director at the base of each indentation. The relief structure alignment layer provides a substantially planar liquid crystal director alignment in the vicinity of the internal surface of each indentation and a substantially homeotropic liquid crystal director alignment in the vicinity of the relief structure surface and in the bulk of the liquid crystal material.

8 Claims, 3 Drawing Sheets

PHORETIC DISPLAY

BACKGROUND OF THE INVENTION

1. Field of the Invention

The present invention relates to a phoretic display incorporating a liquid crystal suspension medium having a preferred configuration therein and to a method of achieving the preferred configuration of the liquid crystal suspension medium within the phoretic display. Such a phoretic display may be used in a wide range of electronic consumer goods, for example household electrical and electronic items, mobile telephones, personal computers, electronic personal organizers, e-book etc.

2. Discussion of Prior Art

Phoretic displays typically comprise a suspension layer containing finely divided phoretic particles dispersed within a liquid suspension medium. The spatial distribution of the phoretic particles within the suspension layer may be altered by applying a magnetic or electric field to the device. The particles migrate within the device under the influence of the applied field.

A phoretic display device exhibiting non-linear optical behavior may be achieved using a phoretic cell incorporating a liquid crystal suspension medium with a phoretic particle suspended therein. The above mentioned phoretic cell and phoretic display are described in further detail in UK patent application GB 0218776.3

In particular an electrophoretic display may be fabricated using an electrophoretic system in which particles of an electrophoretic material are suspended in a liquid crystal suspension medium and where the geometry of the system is arranged to promote defects within the liquid crystal material. A defect may be thought of as a local break in the orientational symmetry of the liquid crystal material, for example a local break in the orientational order of the liquid crystal director. Such defects are sometimes referred to as disclinations in the liquid crystal material.

The liquid crystal alignment is highly distorted in the region immediately surrounding each defect. Hence, there is a large amount of elastic energy associated with each defect. For the purposes of this patent specification this elastic energy shall also be referred to as the defect energy.

The defects within the liquid crystal material are configured to attract electrophoretic particles; each defect giving rise to an associated region of influence within the liquid crystal material. Once within a particular region of influence, an electrophoretic particle is attracted towards the defect associated with that region of influence. If unobstructed, the electrophoretic particle will move within the region of influence to adopt a preferred position where the elastic energy due to the defect is minimised.

The defects create a threshold level in the device. An applied electric field must exceed this threshold, for a sufficient time period, in order to remove a particle from the region of influence associated with a defect. A useful display device may be achieved by selectively positioning the defects in the liquid crystal material at the surface(s) of the display. An image may be formed on the display by varying the spatial distribution of the electrophoretic particles at the defects on the display surface(s). A bistable or multi-stable display may be formed by arranging defects on opposing surfaces of the display.

One technique for selectively positioning the defects at the surface(s) of the display consists of disposing a relief structure at the display surface(s). The profile of the relief structure typically comprises an array of indentations, with each indentation creating a defect site and a preferred position for an electrophoretic particle within the liquid crystal material.

The relief structure surface is adapted to provide a preferred orientation of the liquid crystal material within the display. Typically, the preferred orientation of the liquid crystal material comprises an essentially non-homeotropic alignment of the liquid crystal director at the relief structure surface, i.e. a tangential component of the liquid crystal director is encouraged giving a tilted or planar alignment. The preferred orientation may be achieved by applying a suitable surface alignment treatment to the relief structure.

Notwithstanding the efficacy of the foregoing, circumstances may arise where a simple surface alignment treatment is insufficient to provide the preferred orientation of the liquid crystal material at the relief structure surface. For example, depending upon the particular geometry of the relief structure surface, undesirable parasitic effects may conspire against the creation and correct positioning of defects sites within the phoretic cell.

In particular, problems may be encountered in configurations where the preferred alignment of the liquid crystal material gives rise to strong localised distortions of the liquid crystal director. The distortions within the liquid crystal director create a high degree of elastic or defect energy within the material which can lead to instability of the configuration and to the potential failure of the display.

It is an object of the present invention to mitigate at least some of the disadvantages of the above phoretic display. It is a further object of the present invention to provide a method for achieving the preferred configuration of the liquid crystal suspension medium within the phoretic display.

SUMMARY OF THE INVENTION

According to a first aspect of the present invention, there is now proposed a relief structure alignment layer comprising a relief structure surface incorporating a plurality of indentations, each indentation having an internal surface extending from the relief structure surface; the relief structure alignment layer being adapted to provide a substantially planar liquid crystal director alignment in the vicinity of the internal surface of each indentation and a substantially homeotropic liquid crystal director alignment in the vicinity of the relief structure surface.

In the interests of clarity, the relief structure surface is the facet of the relief structure alignment layer from which the plurality of indentations extend. For the avoidance of doubt, once the plurality of indentations have been formed in the relief structure surface then the internal surfaces of said indentations are no longer considered to comprise part of the relief structure surface.

The relief structure alignment layer is advantageous in that it minimises strong localised distortions of the liquid crystal director when used in conjunction with a liquid crystal material, for example in a display device. Distortions within the liquid crystal director are known to create a high degree of elastic or defect energy within a liquid crystal material which can lead to instability of the preferred liquid crystal alignment. Accordingly, the relief structure alignment layer reduces the degree of elastic or defect energy within the liquid crystal material, thereby improving the stability of a preferred liquid crystal alignment. The relief structure alignment layer allows the indentations to adopt a broader range of useable geometries (whilst maintaining a preferred liquid crystal alignment) than would otherwise be possible.

In a preferred embodiment, the relief structure surface comprises a homeotropic liquid crystal alignment layer to provide the substantially homeotropic liquid crystal director alignment in the vicinity thereof.

In another preferred embodiment, the internal surface of each indentation comprises a planar liquid crystal alignment layer to provide the substantially planar liquid crystal director alignment in the vicinity thereof.

The or each liquid crystal alignment layer may comprises a silane material.

Advantageously, the indentations in the relief structure surface are arranged in an array. The indentations in the relief structure surface may be arranged in a regular array.

Conveniently, the array comprises a two-dimensional array and the indentations are arranged in a close-packed configuration therein. The indentations may be arranged in a hexagonal close-packed configuration within the array. In the interests of clarity, use of the terms close-packed and hexagonal close-packed herein to describe the arrangement of the indentations within the array is analogous to their conventional use in describing crystal lattice structures.

The relief structure alignment layer may comprise a mouldable material. Advantageously, the relief structure alignment layer comprises at least one of a polymer, a photo-polymer, an elastomer, a thermally cured monomer, an optically cured monomer, and a thermoplastic.

Preferably, the indentations comprise substantially semi-ellipsoidal indentations.

Even more preferably, the indentations comprise substantially semi-spheroidal indentations.

Advantageously, the indentations comprise substantially semi-spherical indentations.

Even more advantageously, the indentations comprise substantially hemispherical indentations.

The prefix "semi" as used in the context of this specification shall be taken to define a part or portion of a geometric shape to which it is applied, without limitation to that portion being a half; for example a semi-spheroid shall define a portion of a spheroid (said portion not being limited to a half. Where the portion of a geometric shape comprises substantially a half of said shape, then the prefix "hemi" has been used herein in preference to the more generic prefix "semi"; for example the term "hemisphere" shall define substantially half of a sphere.

According to a second aspect of the present invention, there is now proposed a phoretic display comprising a first display surface for displaying an image, a liquid crystal suspension medium, a plurality of phoretic particles suspended within the suspension medium, and a first relief structure alignment layer according to the first aspect of the present invention, wherein the first relief structure alignment layer is disposed at the first display surface and is arranged to interact with the liquid crystal suspension medium to provide a preferred alignment of the liquid crystal director within the phoretic display.

A phoretic display as described above incorporating the relief structure alignment layer according to the first aspect of the present invention is particularly advantageous in that the relief structure minimises undesirable parasitic effects which may otherwise conspire against the creation and correct positioning of defect sites within the phoretic cell.

In particular, the above configuration precludes strong localised distortions of the liquid crystal director within the display. Consequently, the degree of elastic or defect energy within the material is minimised, thereby improving the stability of the preferred liquid crystal alignment within the phoretic display.

Preferably, each indentation in the first relief structure alignment layer is dimensioned so as to at least partially receive a phoretic particle.

In a preferred embodiment, the phoretic display comprises a second display surface disposed remotely to the first display surface, and a second relief structure alignment layer according to the first aspect of the present invention, wherein the second relief structure alignment layer is disposed at the second display surface and is arranged to interact with the liquid crystal suspension medium to provide a preferred alignment of the liquid crystal director within the phoretic display.

Advantageously, each indentation in the relief structure surface of the first relief structure alignment layer is arranged substantially opposite a corresponding indentation in the relief structure surface of the second relief structure alignment layer, said indentations forming an opposing pair of indentations.

Conveniently, each opposing pair of indentations encompasses a phoretic particle.

The preferred alignment of the liquid crystal director comprises a substantially planar alignment at the internal surface of the indentations, a substantially homeotropic alignment at the at least one relief structure surface and a substantially homeotropic alignment in the bulk of the liquid crystal material.

There is now proposed a phoretic display comprising a first display surface for displaying an image, a liquid crystal suspension medium, a plurality of phoretic particles suspended within the suspension medium, and a first relief structure alignment layer having a relief structure surface incorporating a plurality of indentations, each indentation extending therefrom, arranged at the first display surface; the relief structure alignment layer being adapted to interact with the liquid crystal suspension medium to provide a preferred configuration thereof comprising a substantially planar alignment of the liquid crystal director at the internal surface of the indentations, substantially homeotropic alignment in the bulk of the liquid crystal material and a defect in the liquid crystal alignment associated with each indentation in the absence of a particle therefrom, wherein the preferred configuration of the liquid crystal suspension medium exhibits the lowest elastic energy state within said phoretic display.

The term "associated" has been used in the foregoing to describe the positioning of a defect in the liquid crystal director alignment with respect to each indentation giving rise thereto.

In some cases, but not exclusively, the defects may be "virtual" defects. A virtual defect occurs where the defect centre is actually outside the region of the liquid crystal but it still exerts influence on the behaviour of the liquid crystal. This influence is brought about by the alignment of the liquid crystal at the surface into which the virtual defect is hidden. Typically, a virtual defect may occur in cases where the surface anchoring energy is weak or the surface has a non-zero pretilt.

In the interests of clarity, where there is a reference to a defect in this patent specification, said defect may be a virtual defect hidden in a surface or a conventional defect within the liquid crystal material.

Preferably, the alignment of the liquid crystal suspension medium is substantially undistorted apart from defects associated with each particle and with each indentation in the relief structure surface.

According to a third aspect of the present invention, there is now proposed a method for fabricating a relief structure alignment layer comprising the steps of
(i) preparing a substrate having a relief structure surface,
(ii) imparting substantially homeotropic liquid crystal director alignment properties to the relief structure surface,
(iii) forming a plurality of indentations within the relief structure surface, each indentation having an internal surface extending from the relief structure surface,
(iv) imparting substantially planar liquid crystal director alignment properties to the internal surfaces of the indentations.

Preferably, the step of imparting the substantially homeotropic liquid crystal director alignment properties to the relief structure surface comprises applying a silane surface alignment treatment.

Advantageously, the step of applying the silane surface alignment treatment comprises applying at least one of a chlorosilane material and an alkoxysilane material.

Conveniently, the step of applying the silane surface treatment comprises applying the silane surface treatment to an intermediate surface, and transferring the silane surface treatment therefrom to the relief structure surface by momentary contact between the two surfaces. The intermediate surface may comprise at least one of a substantially flat surface, a substantially cylindrical surface, and a roller.

Preferably, the substrate comprises at least one of a polymer and a pre-polymer and the step of forming the plurality of indentations within the relief structure surface comprises an embossing process.

In a preferred embodiment, the step of forming the plurality of indentations within the relief structure surface is performed prior to the step of imparting the substantially homeotropic liquid crystal director alignment properties to the relief structure surface, such that the substantially homeotropic liquid crystal director alignment properties are imparted only to the relief structure surface interposed between the indentations.

Alternatively, the step of imparting the substantially homeotropic liquid crystal director alignment properties to the relief structure surface is performed prior to the step of forming the plurality of indentations within the relief structure surface. In this embodiment, the substrate comprises a photo-polymer and the step of forming the plurality of indentations within the relief structure surface comprises a photo-lithographic process.

In the interests of clarity, the term photo-polymer shall encompass any photo-reactive or photo-sensitive material whose structure or chemical nature is responsive to electromagnetic radiation, for example a photo-resist material.

In the foregoing method, where a silane surface alignment treatment is applied directly to the relief structure surface (i.e. without the use of an intermediate surface), said silane surface alignment treatment may comprise evaporating the silane surface alignment treatment on to the relief structure surface. Additionally, or alternatively, the silane surface alignment treatment may be applied by washing it on to the relief structure surface in a solvent.

In a preferred embodiment, the substrate inherently imparts planar liquid crystal director alignment properties to the internal surfaces of the indentations. Additionally, or alternatively, the step of imparting substantially planar liquid crystal director alignment properties to the internal surfaces of the indentations comprises applying a silane surface alignment treatment thereto. This may comprise the step of applying a phenyl trichlorosilane material or any other suitable silane material.

The silane material imparting the substantially planar liquid crystal director alignment properties may be applied selectively to the internal surfaces of the indentations. Alternatively, this silane treatment may be applied without discrimination to both the internal surfaces of the indentations and to the pre-silanated relief structure surface. This has the effect of preferentially silanating the insides of the indentations since the surface of the relief structure is already silanated and is therefore substantially unaffected by the subsequent silane treatment.

According to a fourth aspect of the present invention, there is now proposed a method of fabricating a phoretic display comprising a first display surface for displaying an image, a liquid crystal suspension medium, and a plurality of phoretic particles suspended within the suspension medium, comprising the step of disposing a first relief structure alignment layer according to the method of the third aspect of the present invention at the first display surface such that the first relief structure alignment layer interacts with the liquid crystal suspension medium to provide a preferred alignment of the liquid crystal director within the phoretic display.

In a preferred embodiment, the method comprises the further step of disposing a second relief structure alignment layer according to the method of the third aspect of the present invention at a second display surface arranged remotely to the first display surface such that the second relief structure alignment layer interacts with the liquid crystal suspension medium to provide a preferred alignment of the liquid crystal director within the phoretic display.

Advantageously, the method comprises the step of arranging each indentation in the relief structure surface of the first relief structure alignment layer substantially opposite a corresponding indentation in the relief structure surface of the second relief structure alignment layer, said indentations forming an opposing pair of indentations.

Conveniently, the method comprises the step of arranging a phoretic particle within each opposing pair of indentations.

BRIEF DESCRIPTION OF THE DRAWINGS

The invention will now be described, by example only, with reference to the accompanying drawings in which.

DETAILED DESCRIPTION OF THE PREFERRED EMBODIMENTS

Figure 1:
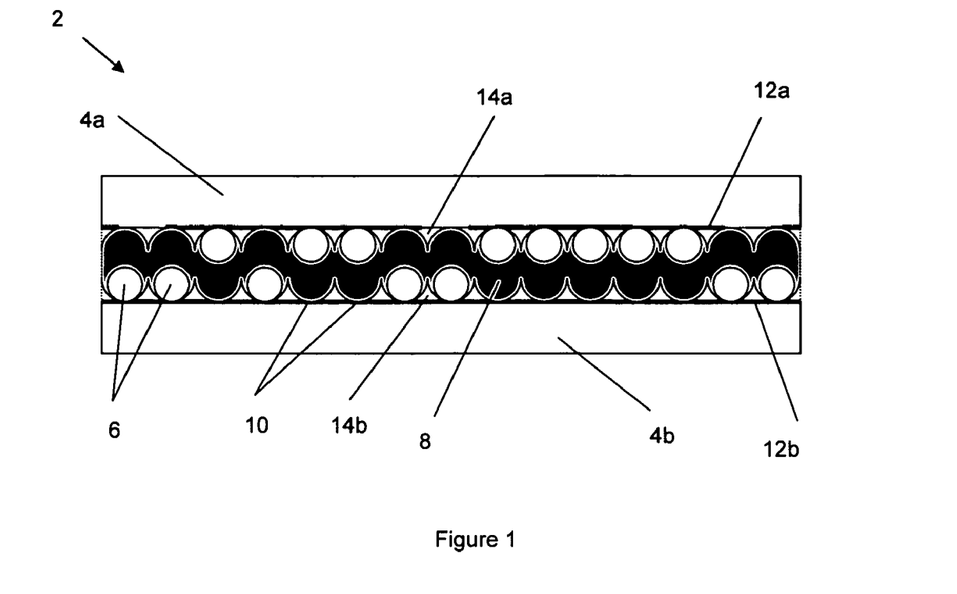
FIG. 1 shows a schematic cross sectional representation of an electrophoretic display comprising an electrophoretic cell having particles of an electrophoretic material suspended within a liquid crystal suspension medium. The electrophoretic cell incorporates relief structures arranged at the surfaces of the display to promote defects within the liquid crystal material.

Referring to FIG. 1, an electrophoretic display 2 comprises an electrophoretic cell in which particles of an electrophoretic material 6 are suspended in a suspension medium 8 comprising a liquid crystal material. The particles of electrophoretic material have an electrical charge associated therewith when suspended in this manner. Application of an electric field to the cell causes the charged particles to move therein under the influence of the applied electric field. The geometry of the system is arranged to promote defects 10 within the liquid crystal material.

The above mentioned electrophoretic cell and electrophoretic display are described in further detail in UK patent application GB 0218776.3 on page 19, line 14 to page 23, line 29.

The operation of the electrophoretic display is described briefly hereunder by way of background to the present invention.

In the above configuration, the presence of the particles of electrophoretic material 6 distorts the alignment of the liquid crystal material in the vicinity of the particles 6 and hence the particles 6 act as mobile defects 10, or collections of defects, within the system. When the particles of electrophoretic material are in the bulk of the suspension medium 8 they are relatively free to move under the influence of an applied electric potential. However, when a particle is within the region of influence associated with a defect 10 in the liquid crystal material, an interaction occurs between the defects 10, thereby reducing the total liquid crystal defect energy within the system. The total liquid crystal defect energy within the system is reduced when the particle 6 and the defect 10 are as close as possible and in some cases superposed, in which case the defects 10 or disclinations effectively annihilate. When the defects 10 interact or annihilate, the particle 6 will tend to adhere to the point in the display where the defect 10 originally occurs or occurred (hereinafter referred to as the defect core).

In the absence of an applied electric potential, the particle of electrophoretic material 6 will tend to remain at a preferred position associated with the defect core. This is because the energy of the material is lower in this configuration (with the particle 6 close to or on top of the defect core) than when the particle 6 is in the bulk liquid crystal material. This provides the advantage that the long term permanence of the image displayed by the device is improved over a conventional electrophoretic display where the electrophoretic material merely adheres to the surfaces of the display due to Van der Waals attraction and electrostatic forces.

In order to remove the particle of electrophoretic material 6 from the region of influence associated with the defect core, an electric potential must be applied to the display which is sufficient to overcome the potential energy barrier associated with the defects 10.

As discussed above, defects interact with each other in order to reduce the elastic energy of the liquid crystal. Accordingly, the defects associated with a particle 6 are influenced by the defects associated with the preferred positions in the liquid crystal cell. Typically, in any particular region of the liquid crystal cell, the region of influence associated with one particular defect will dominate. In this way the elastic energy of the system is reduced by moving the particle 6 towards a defect with opposite strength to the defect(s) associated with the particle 6. Conversely work must be done by an applied electric potential to move the particle 6 from a defect to which it is attracted. With sufficient work done by the applied electric potential then the particle 6 may be moved from the region of influence associated with a particular defect. If insufficient field is applied then the particle will relax back to its initial position. This threshold behaviour imparts a non-linear electro-optic behaviour to the display and is what makes passive matrix addressing of the device possible.

FIG. 1 shows a multi-stable electrophoretic display created by arranging defects 10 in the liquid crystal material 8 on opposing surfaces 4a, 4b within the electrophoretic display 2. For example, a first set of defects 10 is arranged on the first (front) surface 4a of the display whilst a second set of defects 10 is arranged on the second (rear) surface 4b of the display. The particles of electrophoretic material 6 may be encouraged to migrate from the first surface 4a to the second surface 4b of the display (and vice versa) by the application of an electric potential to electrodes 12a, 12b which exceeds the threshold level for a sufficient time period.

As mentioned above, work must be done by the applied electric potential to separate the particle 6 from a defect to which it is attracted. With sufficient work done by the applied electric potential then the particle 6 may be moved to a region of the liquid crystal cell where the region of influence of another defect is dominant. The particle 6 will then relax to a new position in the cell being the preferred position associated with this new defect. Once the region of greatest influence of this second defect is reached it is no longer required that an electric potential is applied to the cell. In this way a threshold in the applied electric potential is required to move the particle 6 far enough away from its initial position so that it relaxes to the a new position in the cell. As discussed above, if the magnitude of the applied field is small and/or the time period for which the field is applied is short then the particle 6 will relax back to its initial preferred position.

The multi-stable display provides the advantage that the particles of electrophoretic material 6 remain bound at the defect cores when no potential is applied the device. Moreover, the particles of electrophoretic material 6 remain substantially bound to the defect cores even in the presence of low level electric potentials (below the threshold level of the device) and where the applied field comprises pulses having a short duration. This is advantageous since such electric potentials are inherent in multiplexed addressing schemes. Image quality and large area addressing capability are therefore ensured by reducing unwanted migration of particles of electrophoretic material 6 within the device.

The defects 10 or disclinations in the liquid crystal material 8 are introduced by a three-dimensional relief structure 14a, 14b which, in this case, comprises a two-dimensional array of concave indentations, each indentation having a depth d, arranged at a pitch p, within the array. FIG. 1 illustrates a specific example where the indentations are approximately hemispherical. However, the shape of the indentations is not limited to a hemispherical form, and in practice the indentations may take the form of any of a wide range of shapes (for example, semi-ellipsoids, semi-spheroids, semi-spheres, rectilinear shapes etc.).

The relief structure surface is adapted to provide a preferred orientation of the liquid crystal material within the display. The preferred alignment of the liquid crystal on the relief structure surface is one which generates +½ defects at the base of the hemispherical indentations. Typically, the preferred alignment of the liquid crystal material comprises an essentially non-homeotropic alignment of the liquid crystal director at the relief structure surface, i.e. a tangential component of the liquid crystal director is encouraged giving a tilted or planar alignment at the surface of the relief structure 14a, 14b. In this configuration, the liquid crystal director adopts a homeotropic alignment in the bulk of the liquid crystal material, i.e. in the middle of the electrophoretic cell.

The preferred alignment may be achieved by applying a suitable surface alignment treatment to the relief structure 14a, 14b.

Notwithstanding the efficacy of the foregoing, circumstances may arise where a simple surface alignment treatment is insufficient to create and maintain the +½ defects at the base of the hemispherical indentations. For example, depending upon the particular geometry of the relief structure, undesirable parasitic effects may conspire against the creation and correct positioning of defect sites within the phoretic cell.

In particular, problems may be encountered in configurations where the preferred alignment of the liquid crystal material gives rise to strong localised distortions of the liquid crystal director. The distortions within the liquid crystal director create a high degree of elastic or defect energy within the material which can lead to instability of the preferred liquid crystal alignment.

Figure 2:
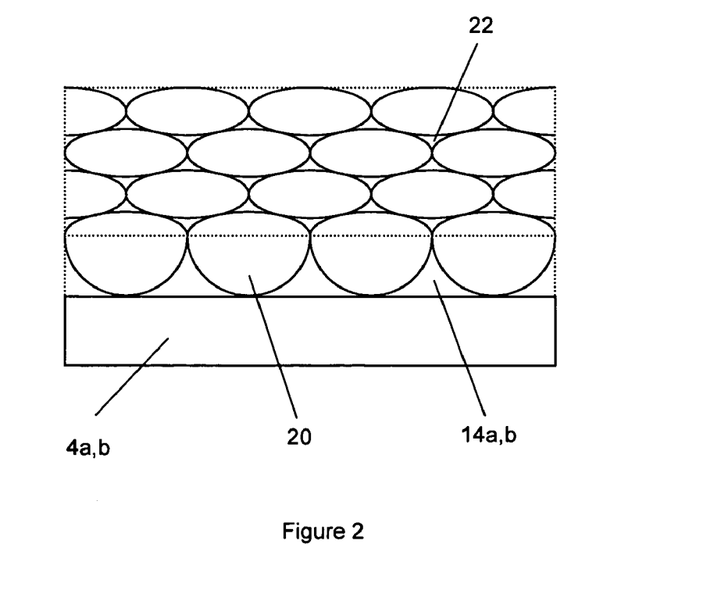
FIG. 2 shows a schematic representation of the internal profile of a typical relief structure used in the electrophoretic display of FIG. 1. The figure illustrates the two-dimensional array of indentations which comprise the internal relief structure and shows the flat regions of the relief structure which occur between the indentations.

A particular configuration which can give rise to strong localised distortions of the liquid crystal director is discussed hereunder with reference to FIG. 2. Note, the electrophoretic particles 6 are not shown in the figure for clarity.

Referring to FIG. 2, where the concave indentations 20 are semi-ellipsoidal, semi-spheroidal, or semi-spherical, the cross section of each indentation at the surface of the relief structure 14a, 14b, will typically be substantially elliptical or substantially circular and hence the indentations cannot cover the whole relief structure surface without intersecting. If the indentations 20 do not intersect then there are regions 22 on top of the relief structure 14a, 14b which are substantially flat.

In the electrophoretic cell 2 the flat tops 22 have the same planar alignment as the rest of the relief structure. As in the foregoing, for the +½ defects 10 to exist at the bottom of the indentations 20 then the liquid crystal alignment in the middle of the cell must be homeotropic. However, corner effects occur where the edges of the indentations intersect with the relief structure surface, due to the fact that the angle subtended at the intersection is approximately 90 degrees (see FIG. 2). Accordingly, the liquid crystal experiences a sharp change in the direction of the director alignment at these intersections. Hence, above the flat top regions 22 the liquid crystal director is highly distorted.

The localised distortions in the liquid crystal director have an important effect on the overall amount of elastic energy associated with this configuration. Accordingly, the configuration described above exhibits a large amount of residual elastic energy within the liquid crystal material due to the cumulative effect of the localised distortions in the liquid crystal director.

A certain degree of residual elastic energy is tolerable within the electrophoretic cell. However, in practice the liquid crystal material will always try to adopt a configuration within the electrophoretic cell which minimises the residual elastic energy. The configuration in which the residual elastic energy is minimised may not always coincide with the preferred configuration of the liquid crystal material within the cell (i.e. that which gives rise to +½ defects 10 at the bottom of the depressions 20, and a substantially homeotropic alignment of the liquid crystal in the middle of the cell). For example, the configuration in which the residual elastic energy is minimised may be that in which there are no defects 10 in the liquid crystal.

Even if the preferred configuration of the liquid crystal material can be achieved at the outset, said configuration may not necessarily be stable if an alternative configuration would provide a lower residual elastic energy.

The method and resulting phoretic cell of the present invention provide a technique for reducing the amount of residual elastic energy present within the electrophoretic cell when the liquid crystal material is arranged in the preferred configuration therein. The technique reduces the localised distortions in the liquid crystal director and ensures that the configuration in which the residual elastic energy is minimised coincides with the preferred configuration of the liquid crystal material within the cell (i.e. that which gives rise to +½ defects 10 at the bottom of the depressions 20, and a substantially homeotropic alignment of the liquid crystal in the middle of the cell).

A phoretic cell according to the present invention has a similar structure to that shown in FIG. 2. However, the alignment of the liquid crystal material in the vicinity of the flat tops 22, interposed between the indentations 20, is homeotropic rather than planar. The alignment of the liquid crystal material within the indentations 20 is planar, in common with the cells described above.

The planar alignment of the liquid crystal material within the indentations 20 gives rise to the required +½ defects 10 at the bottom of the indentations 20 and a substantially homeotropic alignment of the liquid crystal in the middle of the cell. The homeotropic alignment of the liquid crystal material in the vicinity the flat tops 22 reduces localised distortions in the liquid crystal director, leading to a reduction in the residual elastic energy associated with this configuration.

Surface alignment treatments may be applied respectively to the indentations 20 and the flat tops 22 interposed there-between on the relief structure surface to achieve the required liquid crystal alignment.

Three-dimensional modeling has been used to verify that the configuration of the phoretic cell according to the present invention does indeed provide the lowest residual elastic energy.

A three dimensional model was developed to examine the possible alignment configurations of the liquid crystal material in test devices according to the present invention, i.e. with a substantially planar liquid crystal alignment in the indentations 20 and a substantially homeotropic liquid crystal alignment on the flat tops 22.

The model uses the equal elastic constant approximation and performs a relaxation of the director profile to find the local minimum energy alignment from a given starting director configuration.

Figure 3:
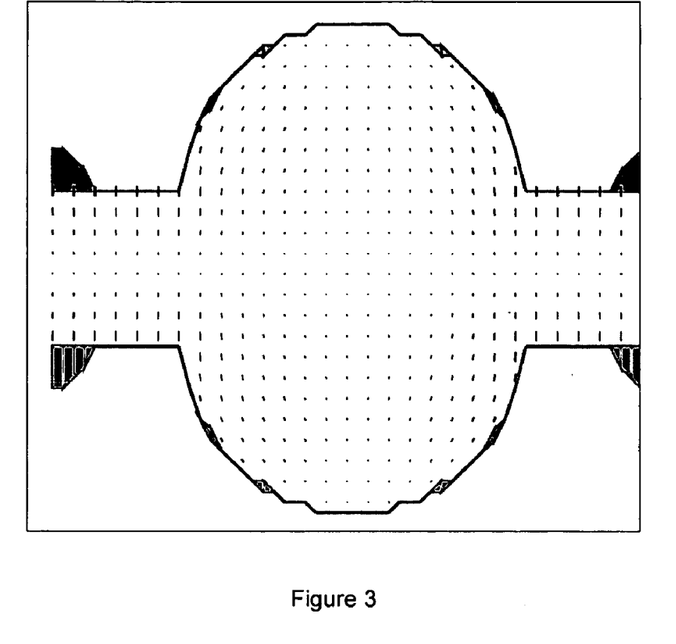
FIG. 3 illustrates the configuration of the liquid crystal director within the electrophoretic cell according to a three-dimensional model of the cell. The figure shows a cross-sectional representation of the modeled cell. In this particular arrangement of the cell the director is aligned predominantly in the plane of the modeled device and perpendicular to the cross-section. This is the 'bulk planar' configuration.
Figure 4:
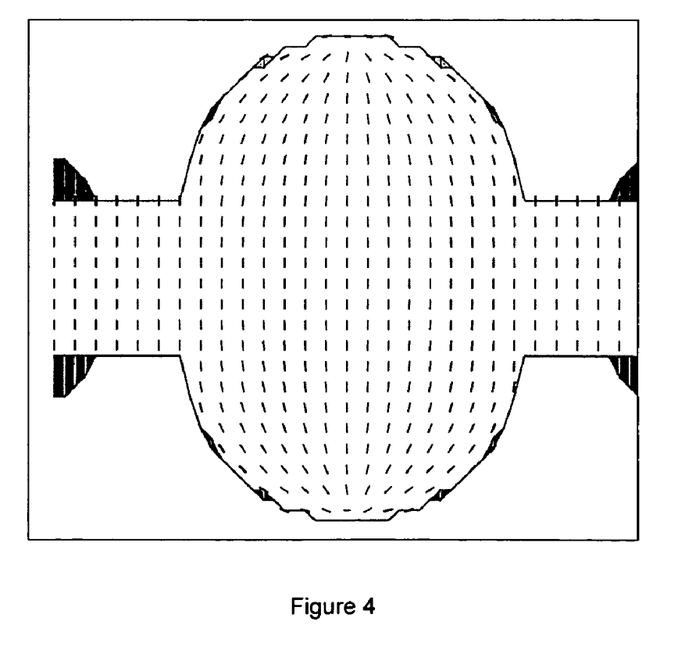
FIG. 4 illustrates an alternative configuration of the liquid crystal director within the electrophoretic cell according to a three-dimensional model of the cell. The figure shows a cross-sectional representation of the modeled cell. In this particular arrangement of the cell the director is aligned predominantly perpendicular to the plane of the modeled device and parallel to the cross-section. This is the 'bulk homeotropic' configuration.

The director configuration was modeled in a range of device geometries where the radius of the depressions was kept constant but the depth was altered. In the modeling geometry the profile of the depressions were taken to be semi-spheroidal or semi-spherical, and in particular hemispherical. In the model the starting point for the director configuration determines the final relaxed director profile since the configuration tends towards local minima. In this way relatively unstable, but locally stable, director configurations, can be assessed. In the course of modeling the director configuration was modeled from two starting positions: one with the director in an alignment perpendicular to the plane of the device (homeotropic) and the second with the director in the plane of the device. From these two positions the director relaxes into configurations that can be distinguished by the alignment being predominantly planar, 'bulk planar' (as shown in FIG. 3), or predominantly homeotropic, 'bulk homeotropic' (as illustrated in FIG. 4).

The energy of these bulk planar and bulk homeotropic states was calculated for changing depression depth and it was found that for all configurations where the indentation depth varies from half the radius to twice the radius then the bulk homeotropic state has the lowest energy.

In practice, the depressions may be generally semi-ellipsoidal, semi-spheroidal, semi-spherical, or hemispherical. Where the indentations exhibit a substantially elliptical cross section at the relief structure surface, the radius shall be taken to be the length of the major semi-axis of the ellipse at the relief structure surface (the semi-axis representing half the length of the axis).

Figure 5:
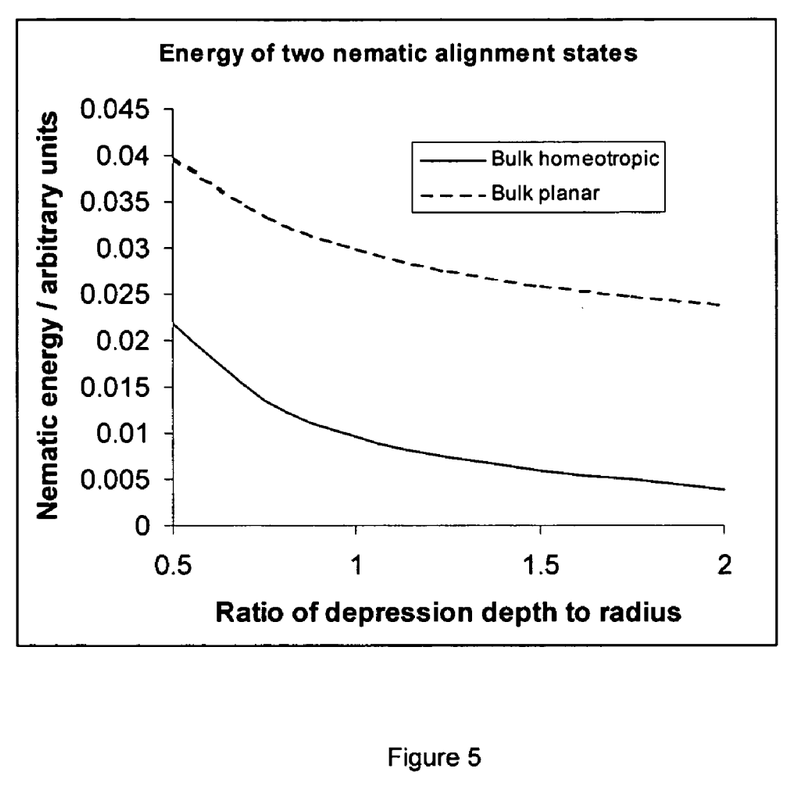
FIG. 5, shows a graph of the calculated relative energies of the two alignment configurations possible in the modeled devices. The bulk homeotropic alignment is always of lower energy for the ratio of depression depth to radius shown in the figure.

FIG. 5 illustrates graphically the calculated relative energies of the two alignment configurations possible in the modeled devices. Note that the bulk homeotropic alignment is always of lower energy for the range of the ratio of depression depth to radius shown in FIG. 5.

From the modeling results, the bulk homeotropic state has the lowest energy for configurations where the indentation depth varies in excess of twice the radius, for example where the relief structure is a deep relief structure.

In practice, the bulk homeotropic state also has the lowest energy for configurations where the ratio of the indentation depth to the radius of the indentation is less than a half. For example, the bulk homeotropic state still has the lowest energy even where the ratio of indentation depth to radius is 0.1 (representing a shallow relief structure). As before, where the indentations exhibit a substantially elliptical cross section at the relief structure surface, the radius shall be taken to be the length of the major semi-axis of the ellipse at the relief structure surface (the semi-axis representing half the length of the axis).

A method according the present invention for fabricating an electrophoretic cell using a photolithographic process comprises the following steps:

A substrate having an electrode pattern thereon is prepared. Photoresist is spun onto the surface of the substrate to give a layer approximately 10 μm (microns) thick. Any of a number of conventional positive photoresists can be used.

After spin coating, the substrate is heated to drive off the solvent from the resist. The top surface of the photoresist is then coated in a suitable chlorosilane material that promotes homeotropic alignment. A suitable chlorosilane may be octyltrichlorosilane, but many variants may be used, including mixtures of silanes.

The following procedure may be used to apply the chlorosilane material. The substrate is placed into a suitable chamber. A small quantity of chlorosilane (typically a few drops) is added into a separate vessel in the chamber. Evacuate the chamber and leave for two hours. Re-pressurise the chamber.

Alternatively, the silane surface alignment treatment may be applied by washing it on to the relief structure surface in a solvent.

The relief structure profile comprising the array of substantially hemispherical indentations is then formed in the silanated photoresist using conventional photolithographic techniques. Typically, a mask and UV light source are used to pattern the photoresist; for example a High Energy Beam Sensitive (HEBS) grey scale photomask (Canyon Materials Inc.) may be used to preferentially expose portions of the photoresist. The photoresist is subsequently developed and the unwanted portions of resist removed, for example by washing the processed substrate. This then gives the surface relief shape shown in FIGS. 1 and 2.

The substrate is processed to cross link the photoresist, thereby improving its resistance to solvents.

Finally, the prepared substrate is assembled into an electrophoretic cell incorporating a liquid crystal suspension medium and a plurality of electrophoretic particles. The electrophoretic particles are typically deposited onto one of the cell substrates as part of the assembly process prior to adding the liquid crystal suspension medium to the cell.

The liquid crystal suspension medium is incorporated into the assembled electrophoretic cell using a capillary process. Alternatively, a conventional vacuum filling process is used, thereby precluding air entrapment within the electrophoretic cell. The liquid crystal is added to the cell slowly in order to minimise disruption of the electrophoretic particles within the cell.

The electrophoretic cell may comprise a single substrate having a relief structure thereon. Alternatively, two prepared substrates may be assembled into an electrophoretic cell and arranged such that each indentation in the relief structure surface on the first substrate is substantially opposite a corresponding indentation in the relief structure surface on the second substrate, said indentations forming a pair of indentations. Typically, a phoretic particle is arranged within each opposing pair of indentations.

The above process provides a homeotropic alignment on the flat tops 22 interposed between the substantially hemispherical indentations 20. In the above method, the photoresist is chosen such that it inherently encourages planar alignment of the liquid crystal on the internal surface of the indentations 20. Hence, there is no requirement to apply an additional surface alignment treatment to the internal surface of the hemispherical indentations 20.

The process of patterning the photoresist can involve several sequential exposure steps using a plurality of masks. The order in which the exposure and silanation steps are performed is not critical, for example the silanation step may be performed prior to exposing the photoresist to UV light through the mask, between multiple exposure steps or after the photoresist has been exposed (but before the development step).

In contrast to the first method described above, in which the photoresist inherently encourages planar alignment on the internal surfaces of the indentations 20, a second silanation step may be optionally included, using a very different silane, after the development step. This has the effect of preferentially silanating the insides of the indentations 20, since the flat top 22 of the surface relief is already silanated. Such a silane could be a phenyl trichlorosilane, or a mixture of silanes which promotes a substantially planar liquid crystal alignment.

A further alternative method according the present invention for fabricating a electrophoretic cell comprises the following steps:

A suitable relief structure profile comprising an array of substantially hemispherical indentations is formed on the surface of the substrate either with the photolithography technique outlined above, removing the silanation steps, or by embossing. The embossing process is carried out by using the photoresist shape to form a mould and then using this mould to emboss a suitable material. Suitable materials would be those that have a surface suitable for reaction with a silane material, typically including exposed OH groups. Alternatively, OH groups could be formed on a wide range of organic materials by exposure of the surface to ozone.

A second surface is coated in a very thin layer (~1 μm or less) of low volatility, but liquid, chlorosilane material suitable for creating a homeotropic layer on a flat surface. It is also possible to use an alkoxysilane material with a catalyst such as butylamine. Suitable materials are those with long alkyl chains such as octadecyltrichlorosilane or octadecyltrimethoxysilane, or a mixture of materials. Alternatively, any known material capable of creating homeotropic alignment is suitable, for example polyimides, lecithin etc.

This second surface may be flat, with the silane coated onto it using one of any number of known techniques. Alternatively the second surface may be a roller in a coating machine onto which the silane has been coated with a doctor blade.

The second surface is momentarily brought into contact with the surface of the relief structure during which some of the silane material is deposited into the flat tops 22 of the relief structure.

Heating or desiccation, then dries the relief structure surface to complete the reaction of the silane with the OH groups on the relief material. Typically this process may take a few minutes or more.

Excess silane is then removed from the surface by rinsing with a suitable solvent.

As before, the prepared substrate is assembled into an electrophoretic cell incorporating a liquid crystal suspension medium and a plurality of phoretic particles. The electrophoretic cell is filled with a liquid crystal suspension medium using a capillary or vacuum filling process.

Sample devices have been fabricated using the above methods in order to verify the technique.

Specifically, a surface relief was made according to the process outlined in the first method described above. This was assembled into a test device with another surface relief opposite and filled with a suitable nematic liquid crystal mixture while the whole device was held at a temperature above the clearing point of the nematic mixture. After filling, the test device was cooled and the alignment of the nematic mixture in the cell was observed to be in the required alignment state by the observation of 'noyaux points' (ref. DeGennes & Prost, 1993, Page 163) within the overwhelming majority of depressions. The regions surrounding these noyaux appear as crosses when observed between crossed polarisers, with the arms of the crosses aligned with the polarisers regardless of the orientation of the test cell. This verifies that these crosses are due to a defect at the centre of the cross.

The embodiments of the present invention comprising electrophoretic displays have been described and illustrated herein as having simple row and column electrodes. However, this is not a limitation and in practice alternative addressing means may be used with the present electrophoretic displays, for example Thin Film Transistor (TFT) matrices.

Notwithstanding the inclusion of electrodes in the electrophoretic display devices described herein, the electrophoretic display may be operated using an electric potential applied to the display via electrodes external to the device. Further, the electric potential may comprise an electrostatic field applied externally to the device via removable electrodes.

The foregoing embodiments of the phoretic display device according to the present invention have been described predominantly in terms of electrophoretic behaviour. However, as highlighted earlier, magnetophoretic behaviour is equally applicable to the embodiments described herein. Indeed magnetophoretic operation may be employed as a substitute for electrophoretic operation in the previous embodiments. Alternatively, magnetophoretic operation and electrophoretic operation may be used in combination to alter the display state of the devices described herein.

In order to incorporate magnetophoretic behaviour into any of the aforementioned embodiments merely requires use of a phoretic particle having magnetic or ferromagnetic properties. The phoretic particle would then respond to an applied magnetic field in a manner analogous to that described previously for an electric field. For example, in a magnetophoretic display according to the present invention, the display state is switchable by applying a magnetic field of a given field strength to the display. The magnetic field may be provided by a permanent magnet (e.g. in the form of a pen or stylus tipped with a magnet) or could be generated electromagnetically. As before, the phoretic particle would migrate within the device under the influence of the applied field (albeit a magnetic field rather than an electric or electrostatic field as before).

A hybrid display device exhibiting both electrophoretic and magnetophoretic behaviour offers further switching combinations. For example, such a hybrid display could be switched spatially using a localised magnetic field from a pen or stylus tipped with a magnet. However, the display could then be erased by application of an electric potential to the entire display, which would switch the phoretic particles to one state as in a purely electrophoretic display. Moreover, information written on such a display may be recorded by detecting the small current pulse induced by the device switching between display states. This detection may be implemented by incorporating patterned electrodes in the display and erasing the image one line at a time.

The invention claimed is:

1. A phoretic display comprising a first display surface for displaying an image, a liquid crystal suspension medium, a plurality of phoretic particles suspended within the suspension medium, and at least a first relief structure alignment layer comprising a relief structure surface incorporating a plurality of indentations, each indentation having an internal surface extending from the relief structure surface; the first relief structure alignment layer being adapted to provide a substantially planar liquid crystal director alignment in the vicinity of the internal surface of each indentation and a substantially homeotropic liquid crystal director alignment in the vicinity of the relief structure surface wherein the first relief structure alignment layer is disposed at the first display surface and is arranged to interact with the liquid crystal suspension medium to provide a preferred alignment of the liquid crystal director within the phoretic display.

2. A phoretic display according to claim 1 wherein each indentation in the first relief structure alignment layer is dimensioned so as to at least partially receive a phoretic particle.

3. A phoretic display according to claim 1 comprising a second display surface disposed remotely to the first display surface, and a second relief structure alignment layer comprising a relief structure surface incorporating a plurality of indentations, each indentation having an internal surface extending from the relief structure surface; the second relief structure alignment layer being adapted to provide a substantially planar liquid crystal director alignment in the vicinity of the internal surface of each indentation and a substantially homeotropic liquid crystal director alignment in the vicinity of the relief structure surface wherein the second relief structure alignment layer is disposed at the second display surface and is arranged to interact with the liquid crystal suspension medium to provide a preferred alignment of the liquid crystal director within the phoretic display.

4. A phoretic display according to claim 3 wherein each indentation in the relief structure surface of the first relief structure alignment layer is arranged substantially opposite a corresponding indentation in the relief structure surface of the second relief structure alignment layer, said indentations forming an opposing pair of indentations.

5. A phoretic display according to claim 4 wherein each opposing pair of indentations encompasses a phoretic particle.

6. A phoretic display according to claim 1 wherein the preferred alignment of the liquid crystal director comprises a substantially planar alignment at the internal surface of the indentations, a substantially homeotropic alignment at the at least one relief structure surface and a substantially homeotropic alignment in the bulk of the liquid crystal material.

7. A phoretic display comprising a first display surface for displaying an image, a liquid crystal suspension medium, a plurality of phoretic particles suspended within the suspension medium, and a first relief structure alignment layer having a relief structure surface incorporating a plurality of indentations, each indentation extending therefrom, arranged at the first display surface; the relief structure alignment layer being adapted to interact with the liquid crystal suspension medium to provide a preferred configuration thereof comprising a substantially planar alignment of the liquid crystal director at the internal surface of the indentations, substantially homeotropic alignment in the bulk of the liquid crystal material and a defect in the liquid crystal alignment associated with each indentation in the absence of a particle therefrom, wherein the preferred configuration of the liquid crystal suspension medium exhibits the lowest elastic energy state within said phoretic display.

8. A phoretic display according to claim 7 wherein the alignment of the liquid crystal suspension medium is substantially undistorted apart from defects associated with each particle and each indentation in the relief structure surface.

* * * * *